(12) United States Patent
Volny et al.

(10) Patent No.: US 10,131,440 B2
(45) Date of Patent: Nov. 20, 2018

(54) INFLATABLE EVACUATION SYSTEM WITH CANOPY SUPPORT

(71) Applicant: Goodrich Corporation, Charlotte, NC (US)

(72) Inventors: Jaro S. Volny, Scottsdale, AZ (US); Drew Hartman, Phoeniz, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 161 days.

(21) Appl. No.: 15/267,602

(22) Filed: Sep. 16, 2016

(65) Prior Publication Data

US 2018/0079513 A1  Mar. 22, 2018

(51) Int. Cl.
*B64C 25/14* (2006.01)
*B64D 25/14* (2006.01)
*A62B 1/20* (2006.01)
*B63C 9/04* (2006.01)

(52) U.S. Cl.
CPC ............ *B64D 25/14* (2013.01); *A62B 1/20* (2013.01); *B63C 2009/044* (2013.01)

(58) Field of Classification Search
CPC .. B64D 25/00; B64D 25/14; B63C 2009/044; B63B 35/58; A62B 1/20
See application file for complete search history.

(56) References Cited

U.S. PATENT DOCUMENTS

| 3,463,266 | A | * | 8/1969 | Day | B64D 25/14 |
| | | | | | 182/48 |
| 3,827,094 | A | * | 8/1974 | Fisher | A62B 1/20 |
| | | | | | 182/48 |
| 3,833,088 | A | * | 9/1974 | Chacko | B64D 25/14 |
| | | | | | 182/48 |
| 3,843,983 | A | | 10/1974 | Gewako | |
| 4,519,782 | A | * | 5/1985 | Fisher | A62B 1/20 |
| | | | | | 182/48 |
| 4,678,443 | A | * | 7/1987 | Edwards | B63C 9/04 |
| | | | | | 441/38 |
| 4,828,520 | A | | 5/1989 | Baughman | |
| 4,846,422 | A | * | 7/1989 | Fisher | B64D 25/14 |
| | | | | | 182/48 |
| 5,360,186 | A | * | 11/1994 | Danielson | B64D 25/14 |
| | | | | | 193/25 B |
| 5,394,822 | A | | 3/1995 | Worland | |
| 5,690,133 | A | | 11/1997 | Capwell | |

(Continued)

FOREIGN PATENT DOCUMENTS

| EP | 0034358 | 8/1981 |
| EP | 0034371 | 8/1981 |

(Continued)

OTHER PUBLICATIONS

European Patet Office, European Search Report dated Jan. 29, 2018 in Application No. 17191177.9-1010.

*Primary Examiner* — Richard R. Green
*Assistant Examiner* — Michael A. Fabula
(74) *Attorney, Agent, or Firm* — Snell & Wilmer L.L.P.

(57) ABSTRACT

An inflatable evacuation device for an aircraft may include at least one chamber and at least one canopy support in fluid communication with the at least one chamber. A retention device may be configured to restrict inflation of the at least one canopy support during inflation of the at least one chamber.

18 Claims, 6 Drawing Sheets

(56) References Cited

U.S. PATENT DOCUMENTS

| | | | | |
|---|---|---|---|---|
| 5,738,305 A * | 4/1998 | Pruitt | ..................... | A62B 1/20 |
| | | | | 182/48 |
| 5,921,830 A * | 7/1999 | Shoaff, III | ................ | B63C 9/02 |
| | | | | 441/37 |
| 6,298,970 B1 * | 10/2001 | Targiroff | ................ | B64D 25/14 |
| | | | | 182/48 |
| 6,536,715 B1 * | 3/2003 | Moran | ................... | B64D 25/14 |
| | | | | 182/48 |
| 6,623,322 B1 * | 9/2003 | Lesniak | ................. | B63B 7/085 |
| | | | | 114/345 |
| 8,702,461 B1 * | 4/2014 | d'Offay | ................... | B63B 35/58 |
| | | | | 114/345 |
| 2005/0115794 A1 * | 6/2005 | Zonneveld | ............... | A62B 3/00 |
| | | | | 193/5 |
| 2014/0366341 A1 * | 12/2014 | Rivault | ................. | B64D 25/14 |
| | | | | 24/714.7 |

FOREIGN PATENT DOCUMENTS

| | | | | | |
|---|---|---|---|---|---|
| EP | 2154062 | | 2/2010 | | |
| GB | 1201914 A | * | 8/1970 | ............ | B64D 25/14 |
| GB | 1201916 A | * | 8/1970 | ............ | B64D 25/14 |
| GB | 1206936 A | * | 9/1970 | ............ | B64D 25/14 |
| GB | 2006124 A | * | 5/1979 | ............... | B63B 7/08 |

* cited by examiner

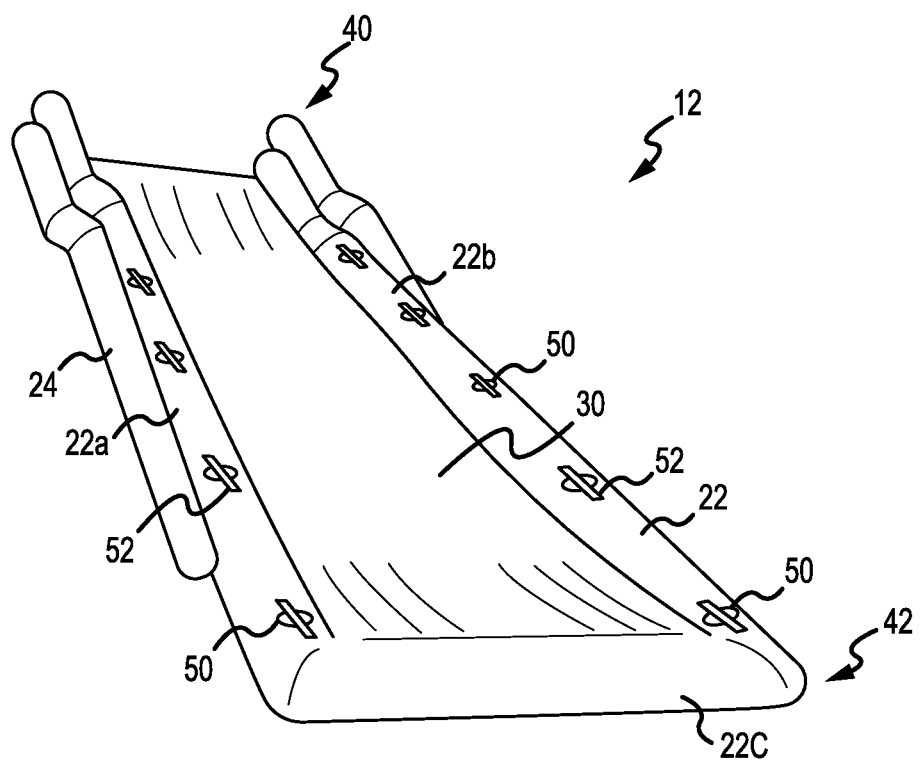
FIG.2
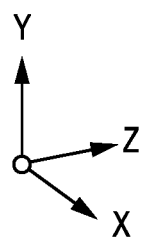

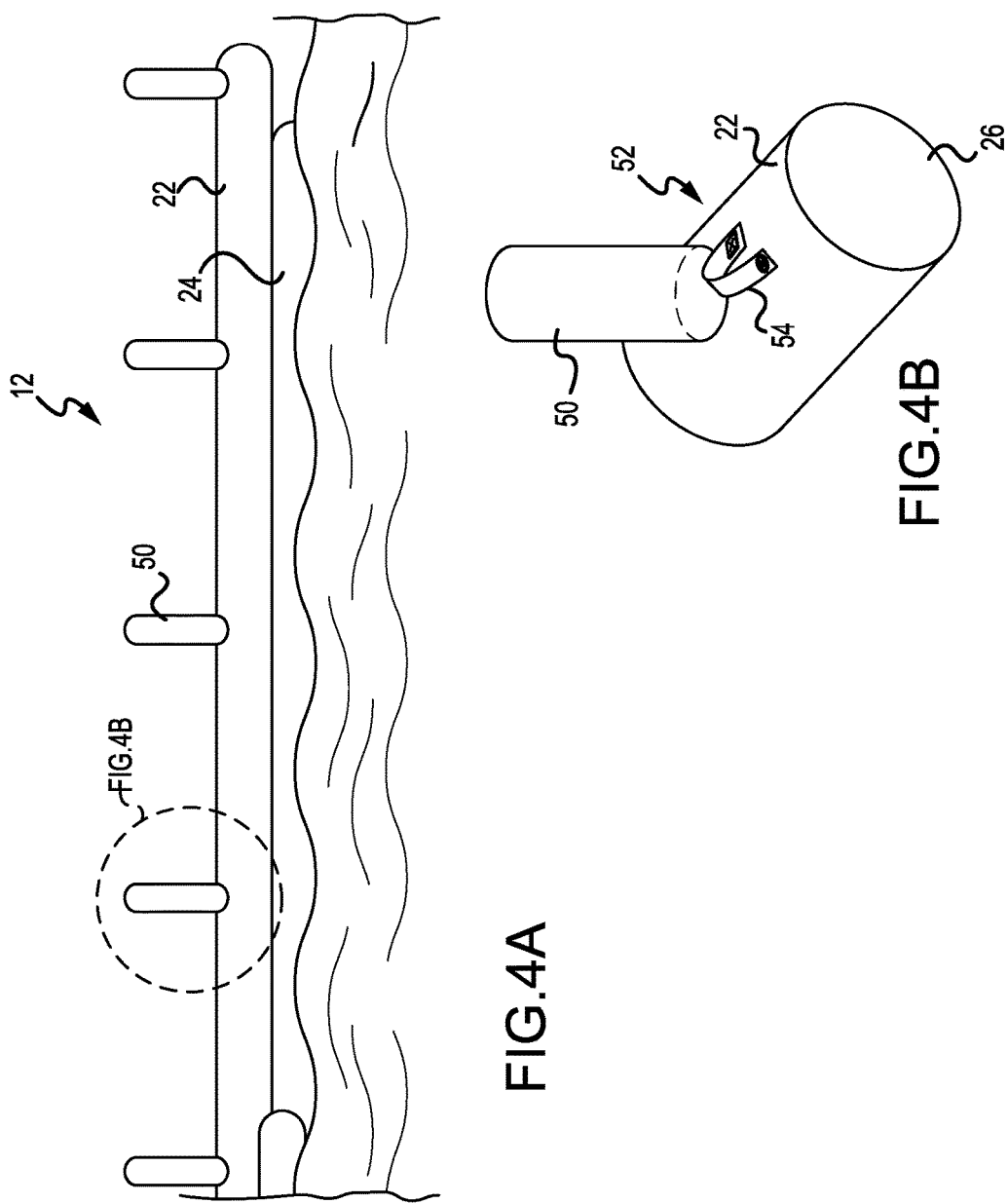

INFLATABLE EVACUATION SYSTEM WITH CANOPY SUPPORT

FIELD

The present disclosure relates to emergency evacuation equipment for aircraft and, more specifically, to inflatable evacuation devices.

BACKGROUND

In the event of an aircraft evacuation, evacuation assemblies, such as evacuation slides, are often deployed to safely usher passengers from the aircraft to the ground. Emergency evacuation slides may be used to exit an aircraft absent a jet way or other means of egress for passengers. An inflation source, such as a compressed air cylinder, is typically packed with the evacuation slide within a small space in the aircraft. The evacuation system may deploy from the side of an aircraft fuselage, for example. An inflatable evacuation slide may require sufficient beam strength to withstand high wind conditions and passenger loads imposed on the slide. In the event of a water landing, various emergency evacuation slides, such as slide rafts, may also be detached from the aircraft to be used as a life raft. Slide rafts may include a canopy, which protects evacuees from the sun while the slide raft is used as a flotation device.

SUMMARY

An inflatable evacuation device for an aircraft is described herein, in accordance with various embodiments. The inflatable evacuation device may comprise at least one chamber and at least one canopy support in fluid communication with the at least one chamber. A retention device may be configured to restrict inflation of the at least one canopy support during inflation of the at least one chamber.

In various embodiments, the at least one canopy support may be configured to inflate in response to release of the retention device. The inflatable evacuation device may further comprise a canopy configured to couple to the at least one canopy support. The retention device may include at least one of a strap or lacing. The retention device may include a first portion releasably coupled to the at least one chamber. The at least one canopy support may be configured to inflate in response release of the first portion. The retention device may be configured to hold the at least one canopy support within an interior of the at least one chamber. The inflatable evacuation device may be configured such that a pressure within the at least one chamber is greater when the at least one canopy support is deflated than when the at least one canopy support is inflated.

An evacuation system is also provided. The evacuation system may comprise an inflation source and an inflatable evacuation device configured to be inflated by the inflation source. The inflatable evacuation device may include at least one chamber and at least one canopy support in fluid communication with the at least one chamber. The inflatable evacuation device may further include a retention device configured to restrict inflation of the at least one canopy support during inflation of the at least one chamber.

In various embodiments, the at least one canopy support may be configured to inflate in response to release of the retention device. The retention device may include at least one of a strap or lacing. The retention device may include a first portion releasably coupled to the at least one chamber. The at least one canopy support may be configured to inflate in response release of the first portion. The retention device may be configured to hold the at least one canopy support within an interior of the at least one chamber. The evacuation system may further comprise a canopy configured to couple to the canopy support. The inflatable evacuation device may comprise a slide raft. The inflatable evacuation device may be configured such that a pressure within the at least one chamber is greater when the at least one canopy support is deflated than when the at least one canopy support is inflated.

A method for deploying an inflatable evacuation device may comprise inflating at least one chamber of an inflatable evacuation device, restricting inflation of at least one canopy support with a retaining device, detaching the inflatable evacuation device from an aircraft, and inflating the at least one canopy support by releasing the retaining device.

In various embodiments, the method may further comprise coupling a canopy to the at least one canopy support. Restricting inflation of the at least one canopy support may be during the inflation of the at least one chamber. The at least one canopy support may be in fluid communication with the at least one chamber. The inflatable evacuation device may comprise a slide raft.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 2 illustrates an inflatable evacuation device having at least one canopy support with a retention arrangement, in accordance with various embodiments;

FIGS. 4A and 4B illustrate an inflatable evacuation device and a canopy support, in accordance with various embodiments;

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "distal" refers to the direction radially outward, or generally, away from the axis of rotation of a turbine engine. As used herein, "proximal" refers to a direction radially inward, or generally, towards the axis of rotation of a turbine engine. With reference to an aircraft evacuation slide, "proximal" refers to a head end, and "distal" refers to a foot end.

Figure 1:
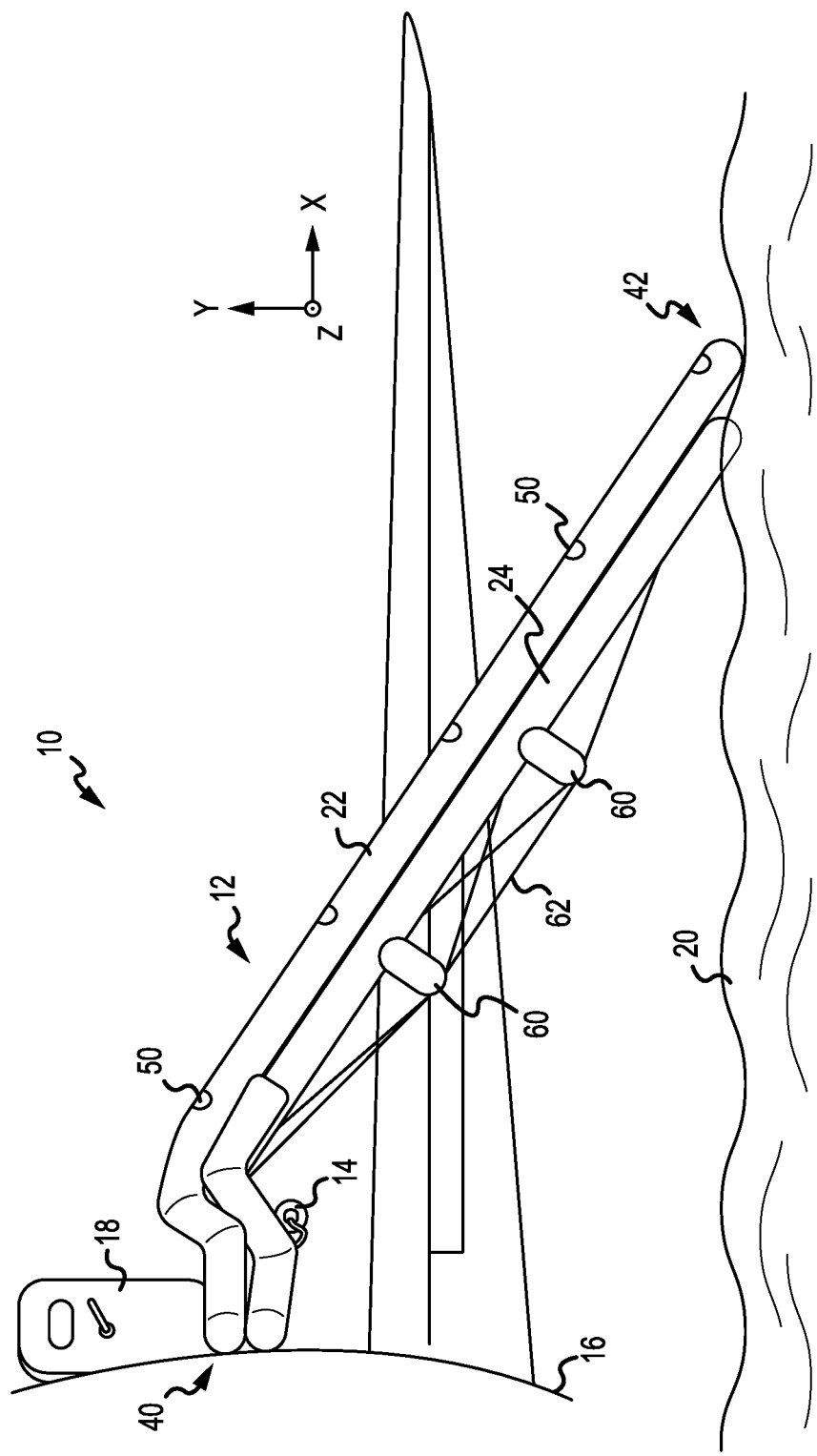
FIG. 1 illustrates an exemplary evacuation system for an aircraft, in accordance with various embodiments.

With reference to FIG. 1, a partial front view of an aircraft having an evacuation system 10 is illustrated, in accordance with various embodiments. Evacuation system 10 may include an inflatable evacuation device 12, which may be a slide, a slide raft, a life raft, or other floatation device. According to various embodiments, inflatable evacuation device 12 may be used for emergency evacuation of an aircraft 16 and may be configured to pack within a compartment of the aircraft 16 (i.e. an aircraft door, a slide bustle, etc.). Evacuation system 10 may include an inflation source 14 coupled to inflatable evacuation device 12 and configured to inflate the inflatable evacuation device 12. Inflation source 14 may be a compressed gas tank, an inflation cylinder, pyrotechnic apparatus or other suitable inflation device. Evacuation system 10 including inflation source 14 and inflatable evacuation device 12 may be stored in an undeployed condition in a packboard housing inside the fuselage of aircraft 16. In various embodiments, for example, an evacuation system 10 may deploy the inflatable evacuation device 12 in response to an emergency exit door 18 opening. Upon initial deployment, inflation source 14 may deliver a pressurized gas to at least partially fill inflatable evacuation device 12 with the pressurized gas. In various embodiments, inflatable evacuation device 12 may be inflated during initial deployment to a pressure, for example, between 2 pounds per square inch (psi) or 13.8 kilopascals (kPA) and 5 psi (34.5 kPA), and more specifically, to a pressure of about 3 psi (20.7 kPA), wherein "about" in this context only means +/−0.5 psi.

In an initial deployed state, inflatable evacuation device 12 may operate as a slide (i.e., "slide mode") to permit egress of passengers from aircraft 16. Inflatable evacuation device 12 may extend from an exit location at an emergency exit door 18 and slope downward (in the negative y-direction) toward an exit surface 20. The exit surface 20 may be water, a runway, uneven terrain or other surface, for example. A proximal end 40 of inflatable evacuation device 12 may be secured to aircraft 16, such as by a girt. A distal end 42 of inflatable evacuation device 12 may reach exit surface 20.

In accordance with various embodiments and with reference to FIGS. 1 and 2, inflatable evacuation device 12 may comprise at least one chamber, such as an upper chamber 22 and/or a lower chamber 24. Each of upper chamber 22 and lower chamber 24 may be configured to inflate by receiving pressurized gas from inflation source 14. Upper chamber 22 and lower chamber 24 may be configured to inflate simultaneously. A sliding surface 30 may be supported by upper chamber 22, lower chamber 24 or by both upper chamber 22 and lower chamber 24. Upper chamber 22 may be a separate chamber from lower chamber 24, such that lower chamber 24 is fluidly isolated from upper chamber 22. Thus, upper chamber 22 and lower chamber 24 may provide redundancy for inflatable evacuation device 12, in that either of upper chamber 22 or lower chamber 24 is configured to support the sliding surface 30 in the event of pressure loss in the other chamber.

Upper chamber 22 may include a plurality of tubes comprising one continuous gas fillable chamber. Upper chamber 22 may include longitudinal tubes 22a, 22b extending from a proximal end 40 of inflatable evacuation device 12 to distal end 42 of inflatable evacuation device 12. Upper chamber 22 may further include one or more transverse tubes 22c extending between longitudinal tubes 22a, 22b. Longitudinal tubes 22a, 22b may be maintained in a spaced-apart configuration by transverse tubes 22c, for example, located at a proximal end 40 and at a distal end 42 of inflatable evacuation device 12. Sliding surface 30 may be coupled to and bordered by longitudinal tubes 22a, 22b and transverse tubes 22c. Upper chamber 22, lower chamber 24 and siding surface 30 may be comprised of a flexible fabric. The flexible fabric may comprise a base cloth with coating, such as nylon or ballistic nylon coated in polyurethane, neoprene and/or aluminum or other suitable coating.

Upper chamber 22 of inflatable evacuation device 12 may further comprise a plurality of canopy supports 50, which are shown in a stowed or undeployed position in FIGS. 1 and 2. Evacuation system 10 may be configured to deploy inflatable evacuation device 12, while canopy supports 50 of inflatable evacuation device 12 remain in an undeployed state. In various embodiments, canopy supports 50 may be mechanically restrained from inflating during an initial deployment of inflatable evacuation device 12 into slide mode. Canopy supports 50 may be coupled to or in fluid communication with upper chamber 22 such that upper chamber 22 and canopy supports 50 comprise one continuous gas fillable chamber. Inflatable evacuation device 12 may comprise one or more canopy supports 50 located on each of longitudinal tubes 22a, 22b. For example, inflatable evacuation device 12 may include four to six canopy supports 50 on each longitudinal tube 22a, 22b for a total of eight to twelve canopy supports 50.

Lower chamber 24 may include a plurality of tubes comprising one continuous gas fillable chamber. Lower chamber 24 may include longitudinal tubes, which may similarly be maintained in a spaced-apart configuration by one or more transverse tubes located at proximal end 40 and at distal end 42 of inflatable evacuation device 12. Lower chamber 24 may include additional support tubes 60 to prevent inflatable evacuation device 12 from buckling under heavy load. A plurality of straps 62 may couple to lower chamber 24 and may operate as tension members to support inflatable evacuation device 12 against buckling under heavy loads.

With reference to FIG. 2, inflatable evacuation device 12 is shown in slide mode, in accordance with various embodiments. In slide mode, it is desirable for inflatable evacuation device 12 to have sufficient rigidity or beam strength for evacuees to jump onto the inflatable evacuation device 12 and slide down. Upper chamber 22 and lower chamber 24 may each inflate to at least a minimum pressure to provide sufficient beam strength to operate as a slide. For example, a pressure of 3.0 psi (20.7 kPA) may be a minimum pressure desired for slide mode to achieve a desired beam strength. A minimum pressure within upper chamber 22 and lower chamber 24 that allows inflatable evacuation device 12 to function as a slide may be greater than a minimum pressure that allows inflatable evacuation device 12 to function as a raft (i.e., "raft mode"). In other words, less pressure within inflatable evacuation device 12 may still provide sufficient buoyancy in raft mode. For example, a pressure of 1.0 psi (6.9 kPA) may be a minimum pressure for inflatable evacuation device 12 to achieve a desired buoyancy in raft mode.

In various embodiments, upper chamber 22 and lower chamber 24 may inflate upon deployment of inflatable evacuation device 12, while canopy supports 50 remain uninflated. By preventing canopy supports 50 from inflating during initial deployment of inflatable evacuation device 12, the inflatable interior volume of upper chamber 22 is effectively reduced. Reducing the interior volume of upper chamber 22 results in an increase in pressure within upper chamber 22. A greater pressure within upper chamber 22 provides a greater beam strength for inflatable evacuation device 12. Depending, in part, on the size of inflatable evacuation device 12 and the number of canopy supports 50, the canopy supports 50, when inflated, may comprise 4% to 5% of a volume of upper chamber 22. Restricting the inflation of canopy supports 50 and reducing the volume of upper chamber 22 by, for example, 4% to 5% results in a 4% to 5% pressure increase in upper chamber 22. With a higher operating pressure, inflatable evacuation device 12 can support evacuees leaving the aircraft at a higher rate and increases overall performance of inflatable evacuation device 12 including its resistance to wind.

In various embodiments, canopy supports 50 may be mechanically prevented from inflating, by operation of a retention device 52, during the initial inflation of inflatable evacuation device 12. Canopy supports 50 may be integral with or coupled to upper chamber 22 such that during the inflation of upper chamber 22, canopy supports 50 would also inflate if retention devices 52 were not present. Retention devices 52 may include a flap, cover, lacing, cable, webbing, string, strap, tape, fastener or other retention feature. Each canopy support 50 may include a retention device 52 that restrains a canopy support 50 to reduce or prevent inflation of the canopy support 50. Inflatable evacuation device 12 may comprise at least as many retention devices 52 as canopy supports 50.

Figure 3B:
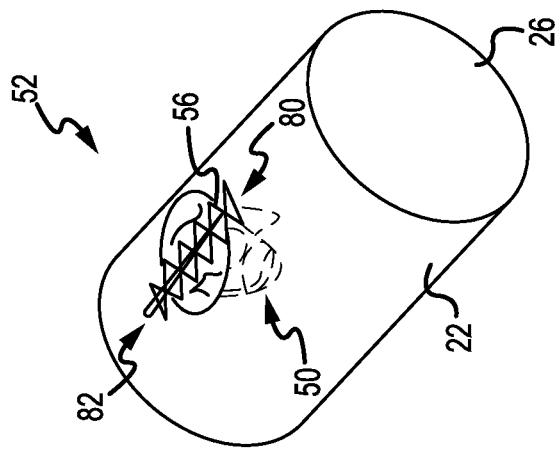
FIGS. 3A and 3B illustrate a retention device for a canopy support, in accordance with various embodiments.
Figure 3A:
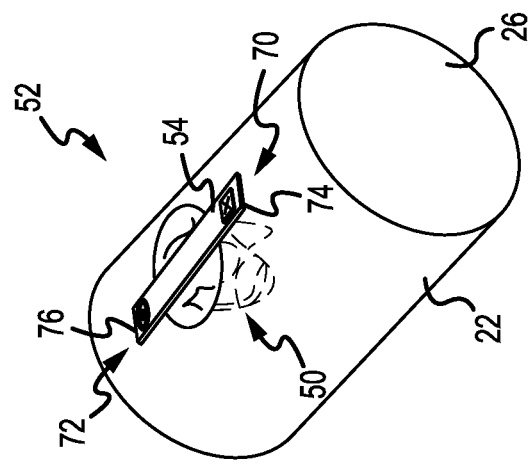

With reference to FIG. 3A, a retention device 52 for a canopy support 50 is shown, in accordance with various embodiments. In various embodiments, retention device 52 may comprise a webbing or strap 54. Strap 54 may be made of a strong woven material, such as nylon. Retention device 52, such as strap 54, may comprise a first portion 70 fixedly coupled to upper chamber 22 and a second portion 72 releasably coupled to upper chamber 22. For example, first portion 70 of strap 54 may be secured to or permanently attached to a surface of upper chamber 22 by stitching 74, adhesive and/or other suitable method. Second portion 72 of strap 54 may be removably coupled to a surface of upper chamber 22 by a snap 76 or other disengagable fastener.

Canopy supports 50 may comprise a flexible fabric. In various embodiments, the flexible fabric is the same or similar type of flexible fabric used in upper chamber 22. Canopy supports 50 may comprise a base cloth with coating, such as nylon or ballistic nylon coated in polyurethane, neoprene and/or aluminum or other suitable coating. Being made of a flexible fabric, in an uninflated state, the canopy supports 50 are capable of being folded, bunched, rolled up, or otherwise compacted. Inflatable evacuation device 12 may be packed such that canopy supports 50 are disposed within an interior 26 of upper chamber 22. Canopy supports 50 may be held within an interior 26 of upper chamber 22 by strap 54. During initial deployment of inflatable evacuation device 12, upper chamber 22 inflates and straps 54 hold canopy supports 50 within the interior 26 of upper chamber 22. Straps 54 may be disposed over a canopy support 50 to hold canopy support 50 in an uninflated position. Second portion 72 of strap 54 may be configured to be released from upper chamber 22 by manually unsnapping snap 76.

With reference to FIG. 3B, a retention device for a canopy support 50 is shown, in accordance with various embodiments. In various embodiments, retention device 52 may comprise lacing 56. Lacing 56 may comprise a speed lacing, a drawstring or other cord restraint. Retention device 52, such as lacing 56, may comprise a first portion 80 and a second portion 82 coupled to a surface of upper chamber 22. Lacing 56 may be coupled to each of first portion 80 and second portion 82 such that lacing 56 spans a canopy support 50 to hold canopy support 50 within the interior 26 of upper chamber 22. Lacing 56 may be disposed over a canopy support 50 to hold canopy support 50 in an uninflated position. Lacing 56 may be configured to unlace or unravel by releasing a single end of lacing 56.

Referring momentarily to FIGS. 1 and 2 and still to FIGS. 3A and 3B, when inflatable evacuation device 12 is assembled and packed into aircraft 16, canopy supports 50 may be folded, tucked or otherwise inverted into upper chamber 22. A retention device 52 may be secured over each canopy supports 50. For evacuation devices that are produced without retention device 52, the evacuation devices may be retrofitted by adding retention devices 52 at a lower cost than the cost to produce new inflatable evacuation devices 12.

With reference to FIG. 4A, an inflatable evacuation device 12 is shown in raft mode with deployed canopy supports 50, in accordance with various embodiments. After initial deployment of inflatable evacuation device 12 and evacuation by evacuees, inflatable evacuation device 12 may be detached from the aircraft and used as a raft. The pressure within upper chamber 22 and lower chamber 24 provides buoyancy in the water. In raft mode, inflatable evacuation device 12 may provide sufficient buoyancy using less pressure than was used in slide mode for sufficient beam strength. Canopy supports 50 are configured to fill with gas from upper chamber 22, while upper chamber 22 maintains sufficient pressure for raft mode. Inflatable evacuation device 12 may be configured such that a pressure within upper chamber 22 is greater when at least one canopy support 50 is deflated than when the canopy support 50 is inflated.

With reference to FIG. 4B, a canopy support 50 is shown in a deployed state, in accordance with various embodiments. Canopy supports 50 may be integral with or coupled to upper chamber 22, canopy supports 50 are in fluid communication with upper chamber 22. Upon release of retention device 52, canopy supports 50 are configured to inflate by gas from upper chamber 22 freely flowing into canopy supports 50. The inflated canopy supports 50 extend outward from a surface of upper chamber 22. A gas pressure within canopy supports 50 may be the same as or similar to a gas pressure within upper chamber 22.

Figure 5:
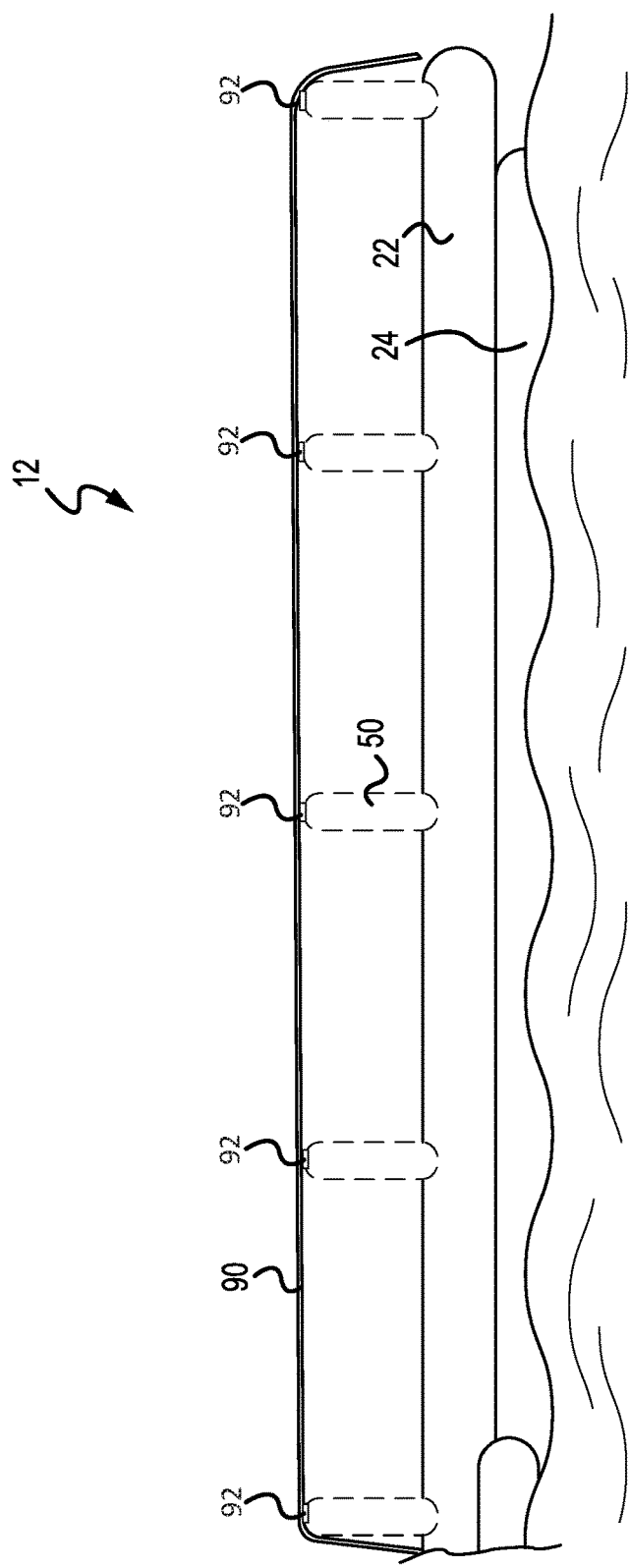
FIG. 5 illustrates an inflatable evacuation device and a canopy supported by a canopy support, in accordance with various embodiments.

In various embodiments and with reference to FIG. 5, an inflatable evacuation device 12 is shown with a canopy 90 supported by a plurality of canopy supports 50. In various embodiments, canopy 90 is configured to be coupled to one or more canopy supports 50 after inflation of canopy supports 50. Canopy 90 and/or canopy supports 50 may include one or more fasteners 92 for manually coupling canopy 90 to canopy supports 50. Canopy 90 may comprise any suitable type of canopy and any suitable type of material, such as, for example, canvas, silk, nylon, ballistic nylon, aramid fiber, polyethylene terephthalate, and/or the like. Canopy supports 50 are configured to hold canopy 90 over the upper chamber 22 and sliding surface 30 (see FIG. 2) to provide cover for evacuees. Canopy supports 50 are inflated with enough pressure to provide a substantially rigid support for holding canopy 90 away from upper chamber 22. For example, canopy supports 50 may be inflated to a pressure of 1.0 psi (6.9 kPA) or greater.

Figure 6:
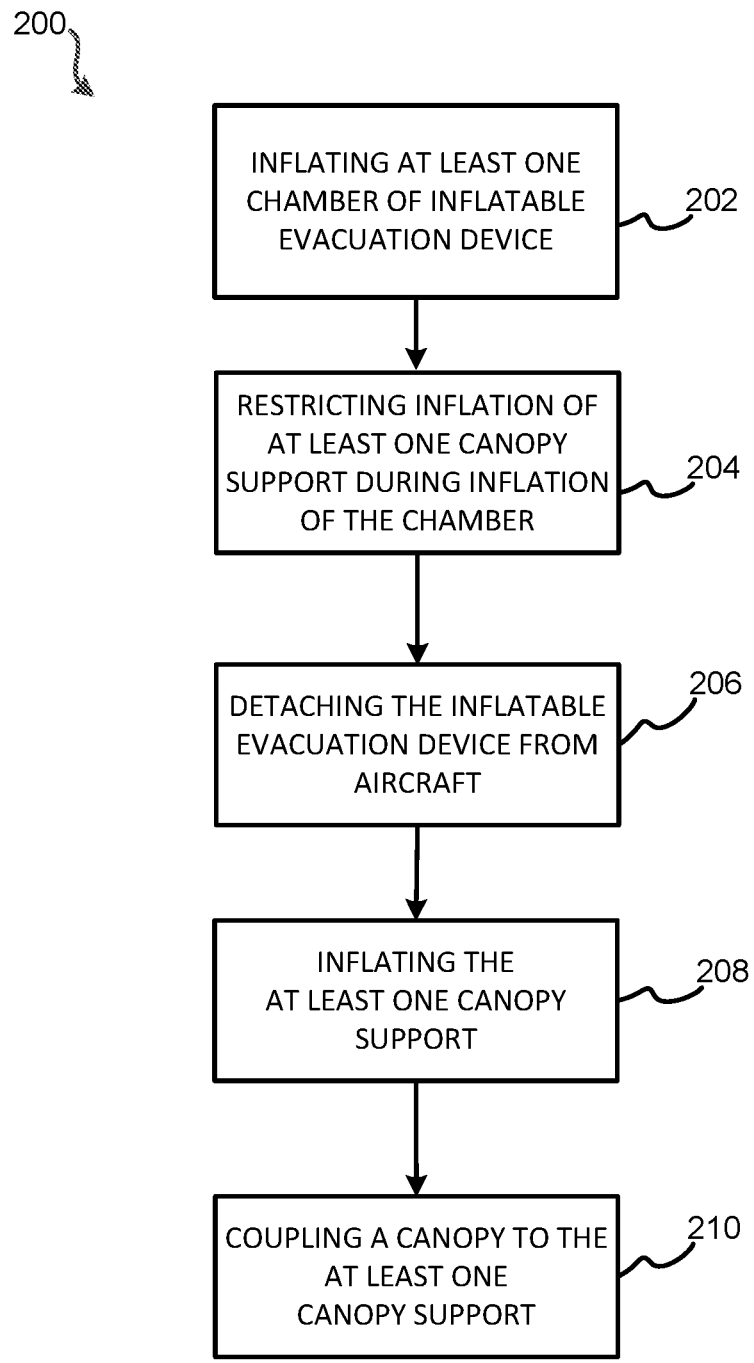
FIG. 6 illustrates a method of deploying an inflatable evacuation device with a canopy support, in accordance with various embodiments.

With reference to FIG. 6, a method 200 for deploying an inflatable evacuation device is shown, in accordance with various embodiments. Method 200 may comprise the steps of inflating at least one chamber of an inflatable evacuation device (step 202), restricting inflation of at least one canopy support during the inflation of the at least one chamber (step 204), detaching the inflatable evacuation device from an aircraft (step 206), inflating the at least one canopy support (step 208), and coupling a canopy to the at least one canopy support (210).

Method 200 may comprise deploying inflatable evacuation device 12 in response to opening an emergency exit door 18 of aircraft 16. Step 202 may further comprise inflating an upper chamber 22 and a lower chamber 24 of inflatable evacuation device 12 in response to opening the emergency exit door 18 of aircraft 16. Step 204 may further comprise restricting inflation of a canopy support 50 by mechanically retaining canopy support 50 with a retention device 52. Step 204 may further comprise restricting inflation of the canopy support 50 during inflation of upper chamber 22. Restricting inflation of a plurality of canopy supports 50 during initial inflation of upper chamber 22 may decrease an inflatable volume of upper chamber 22 and thereby increase a pressure in upper chamber 22. Inflatable evacuation device 12 may be a slide raft and may be used as an evacuation slide.

Step 206 may further comprise detaching inflatable evacuation device 12 to use as a life raft. Step 208 may further comprise releasing a retention device 52 to allow canopy support 50 to inflate, gas to flows from the already inflated upper chamber 22 into canopy support 50. In various embodiments, each of a plurality of canopy supports 50 is retained by an individual retention device 52. Inflating the canopy supports 50 may comprise manually releasing each retention device 52. The canopy supports 50 may be in fluid communication with upper chamber 22. Upon releasing retention devices 52, canopy supports 50 automatically inflate by the gas pressure already within upper chamber 22. Thus, method 200 may comprise partially deploying inflatable evacuation device 12 during initial deployment and further deploying a plurality of canopy supports 50 after initial deployment of inflatable evacuation device 12.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An inflatable evacuation device for an aircraft, comprising:
   a chamber;
   a canopy support located completely within an interior of the chamber and in fluid communication with the chamber;
   a retention device configured to restrict inflation of the canopy support during inflation of the chamber, wherein the retention device is configured to hold the canopy support completely within the interior of the chamber; and
   a canopy configured to couple to the canopy support.

2. The inflatable evacuation device of claim 1, wherein the canopy support is configured to inflate in response to release of the retention device.

3. The inflatable evacuation device of claim 1, wherein the retention device includes at least one of a strap or lacing.

4. The inflatable evacuation device of claim 1, wherein the retention device includes a first portion releasably coupled to the chamber and wherein the canopy support is configured to inflate in response to release of the first portion.

5. The inflatable evacuation device of claim 1, wherein the retention device is configured to hold the canopy support within an interior of the chamber.

6. The inflatable evacuation device of claim 1, wherein the inflatable evacuation device is configured such that a pressure within the chamber is greater when the canopy support is deflated than when the canopy support is inflated.

7. An evacuation system, comprising:
   an inflation source; and
   an inflatable evacuation device configured to be inflated by the inflation source, the inflatable evacuation device including:
      a chamber,
      a canopy support located completely within an interior of the chamber and in fluid communication with the chamber,
      a retention device configured to restrict inflation of the canopy support during inflation of the chamber; and
      a canopy configured to be supported by the canopy support.

8. The evacuation system of claim 7, wherein the canopy support is configured to inflate in response to release of the retention device.

9. The evacuation system of claim 7, wherein the retention device includes at least one of a strap or lacing.

10. The evacuation system of claim 7, wherein the retention device includes a first portion releasably coupled to the chamber and wherein the canopy support is configured to inflate in response release of the first portion.

11. The evacuation system of claim 10, wherein the retention device is configured to hold the canopy support within the interior of the chamber.

12. The evacuation system of claim 7, wherein the inflatable evacuation device comprises a slide raft.

13. The evacuation system of claim 7, wherein the inflatable evacuation device is configured such that a pressure within the chamber is greater when the canopy support is deflated than when the canopy support is inflated.

14. A method, comprising:
    inflating a chamber of an inflatable evacuation device;
    restricting an inflation of a canopy support located completely within an interior of the chamber of the inflatable evacuation device using a retaining device;
    detaching the inflatable evacuation device from an aircraft;
    inflating the canopy support by releasing the retaining device; and
    coupling a canopy to the canopy support, after the inflating the canopy support.

15. The method of claim 14, wherein prior to the inflating the canopy support, the canopy support is located completely within an interior of the chamber.

16. The method of claim 15, wherein the restricting the inflation of the canopy support is during the inflation of the chamber.

17. The method of claim 15, wherein the canopy support is in fluid communication with the chamber.

18. The method of claim 14, wherein the inflatable evacuation device comprises a slide raft.

\* \* \* \* \*